US008627714B2

(12) United States Patent
Christmann

(10) Patent No.: US 8,627,714 B2
(45) Date of Patent: Jan. 14, 2014

(54) METHOD FOR PREVENTING THE RUPTURE OF A COMPRESSOR WHEEL AND/OR TURBINE WHEEL OF AN EXHAUST-GAS TURBOCHARGER

(75) Inventor: Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 159 days.

(21) Appl. No.: 13/133,208

(22) PCT Filed: Dec. 4, 2009

(86) PCT No.: PCT/US2009/066667
§ 371 (c)(1), (2), (4) Date: Jun. 7, 2011

(87) PCT Pub. No.: WO2010/077559
PCT Pub. Date: Jul. 8, 2010

(65) Prior Publication Data

US 2011/0239647 A1 Oct. 6, 2011

(30) Foreign Application Priority Data

Dec. 9, 2008 (DE) ......................... 10 2008 061 154

(51) Int. Cl.
*G01M 15/04* (2006.01)

(52) U.S. Cl.
USPC ........................................................ 73/114.77

(58) Field of Classification Search
USPC ................ 73/112.01, 112.03, 112.05, 114.77
See application file for complete search history.

(56) References Cited

U.S. PATENT DOCUMENTS

| | | | | |
|---|---|---|---|---|
| 6,163,254 | A * | 12/2000 | Smith et al. | 340/439 |
| 6,209,390 | B1 | 4/2001 | LaRue et al. | |
| 7,104,120 | B2 | 9/2006 | Gladden | |
| 7,937,996 | B2 * | 5/2011 | He et al. | 73/114.77 |
| 2005/0274112 | A1 * | 12/2005 | Matsumoto et al. | 60/602 |
| 2008/0053087 | A1 * | 3/2008 | Swenson et al. | 60/599 |
| 2009/0013687 | A1 * | 1/2009 | Swenson et al. | 60/600 |
| 2009/0055072 | A1 * | 2/2009 | He et al. | 701/102 |
| 2010/0324799 | A1 * | 12/2010 | Davison | 701/100 |
| 2010/0332180 | A1 * | 12/2010 | Seidel et al. | 702/145 |

FOREIGN PATENT DOCUMENTS

| | | | |
|---|---|---|---|
| JP | 2002-544443 | A | 12/2002 |
| JP | 2003-113795 | A | 4/2003 |
| JP | 2005-248952 | A | 9/2005 |

* cited by examiner

*Primary Examiner* — Eric S McCall
(74) *Attorney, Agent, or Firm* — William G. Anderson; Stephan A. Pendorf; Patent Central LLC

(57) ABSTRACT

A method for preventing the rupture of a compressor wheel and/or turbine wheel of an exhaust-gas turbocharger of a motor vehicle includes establishing loading limit values (n(G)) for the compressor wheel and/or the turbine wheel in bench tests. The method further includes determining loading variables (n) for the compressor wheel and/or turbine wheel during the operation of the exhaust-gas turbocharger in the motor vehicle. In addition, the method includes processing the determined loading variables (n) in order to establish a loading characteristic value (n(i)) which represents real exhaust-gas turbocharger operation. Further, the method includes comparing the loading limit value (n(G)) with the loading characteristic value (n(i)). The method also includes outputting a warning (W) if the comparison of the loading limit value (n(G)) with the loading characteristic value (n(i)) yields an exceedance of a predefinable safety margin.

5 Claims, 2 Drawing Sheets

METHOD FOR PREVENTING THE RUPTURE OF A COMPRESSOR WHEEL AND/OR TURBINE WHEEL OF AN EXHAUST-GAS TURBOCHARGER

FIELD OF THE INVENTION

The invention relates to a method for preventing the rupture of a compressor wheel and/or turbine wheel of an exhaust-gas turbocharger which is used in motor vehicles.

BACKGROUND OF THE INVENTION

The expression “rupture” is to be understood to mean an explosive disintegration of a compressor wheel and/or turbine wheel on account of excessive loading. Under sufficiently high loading, such a rupture may even occur in turbine and compressor wheels which have been produced to a correct specification, that is to say which do not have any production defects.

One possible cause of a rupture of said type is an excessively high rotational speed of the turbocharger, which may for example occur if the turbocharger and/or the motor vehicle in which the turbocharger is installed have/has been manipulated.

Such loading is generally a one-off loading which leads to the rupture of the wheel.

Of more importance in practice, however, are loadings which are within the normally permitted limits but which may add up on account of a high number of cyclic repetitions, for example constant changes in rotational speed.

SUMMARY OF THE INVENTION

It is therefore an object of the present invention to create a method for preventing the rupture of a compressor wheel and/or of a turbine wheel of an exhaust-gas turbocharger which is used in motor vehicles.

Said object is achieved by establishing loading limit values (n(G)) for the compressor wheel and/or the turbine wheel in bench tests. Loading variables (n) for the compressor wheel and/or turbine wheel can be determined during the operation of the exhaust-gas turbocharger in the motor vehicle. The determined loading variables (n) can be processed in order to establish a loading characteristic value (n(i)) which represents real exhaust-gas turbocharger operation. The loading limit value (n(G)) can be compared with the loading characteristic value (n(i)). A warning (W) can be output if the comparison of the loading limit value (n(G)) with the loading characteristic value (n(i)) yields an exceedance of a predefinable safety margin.

DETAILED DESCRIPTION OF THE INVENTION

Figure 1:
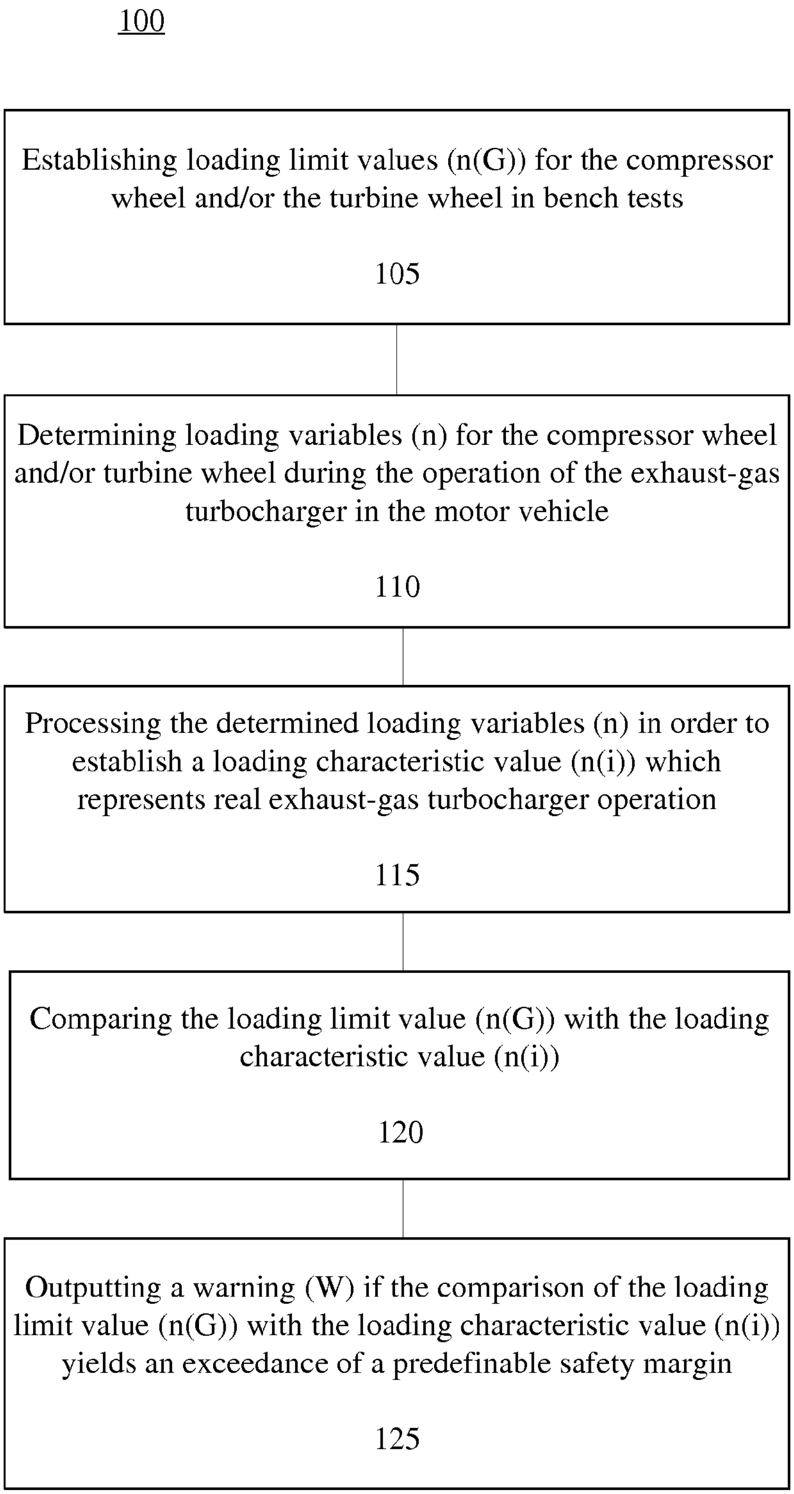
FIG. 1 is a flow chart illustrating a method for preventing the rupture of a compressor wheel and/or turbine wheel of an exhaust-gas turbocharger of a motor vehicle.

FIG. 1 is a flow chart illustrating a method 100 for preventing the rupture of a compressor wheel and/or turbine wheel of an exhaust-gas turbocharger of a motor vehicle. At step 105, loading limit values for the compressor wheel and/or the turbine wheel are firstly established, said loading limit values being determined during the course of bench tests. One option for such a bench test is the frequent repetition of a start/stop process for the respective wheel, which represents the most severe loading test since the wheel constantly fluctuates between standstill and maximum rotational speed.

It is however alternatively conceivable for a multiplicity of different loading cycles to be run through in the bench test, with the aim being to reproduce a multiplicity of real driving conditions.

The result in every situation is the establishment of a loading limit value which represents the time at which, statistically, a rupture of the compressor and/or turbine wheel would occur.

The method according to the invention also comprises, at step 110, determining loading variables for the compressor wheel and/or turbine wheel during the operation of the exhaust-gas turbocharger in the motor vehicle. For this purpose, consideration should be given in particular to the engine rotational speed and/or the rotational speed of the exhaust-gas turbocharger and/or the time periods of the occurrence of certain rotational speeds and/or the exhaust-gas turbocharger rotational speed gradients and/or the change in altitude and/or kilometers covered by the motor vehicle. The determined loading variables can be processed by means of a mathematical algorithm.

At step 115, said determined loading variables, and if appropriate also further suitable variables, are used to establish a loading characteristic value which represents real exhaust-gas turbocharger operation.

At step 120, said loading characteristic value is compared with the loading limit value in order to establish whether, statistically, there is a threat of a rupture of a compressor wheel and/or turbine wheel.

At step 125, if said comparison yields that a safety margin which can be defined on the basis of the previously established loading limit value is exceeded, a warning is output such that it is possible for the operator of a motor vehicle which uses a turbocharger to reduce the loading before the occurrence of a rupture and to have suitable repairs carried out.

Figure 2:
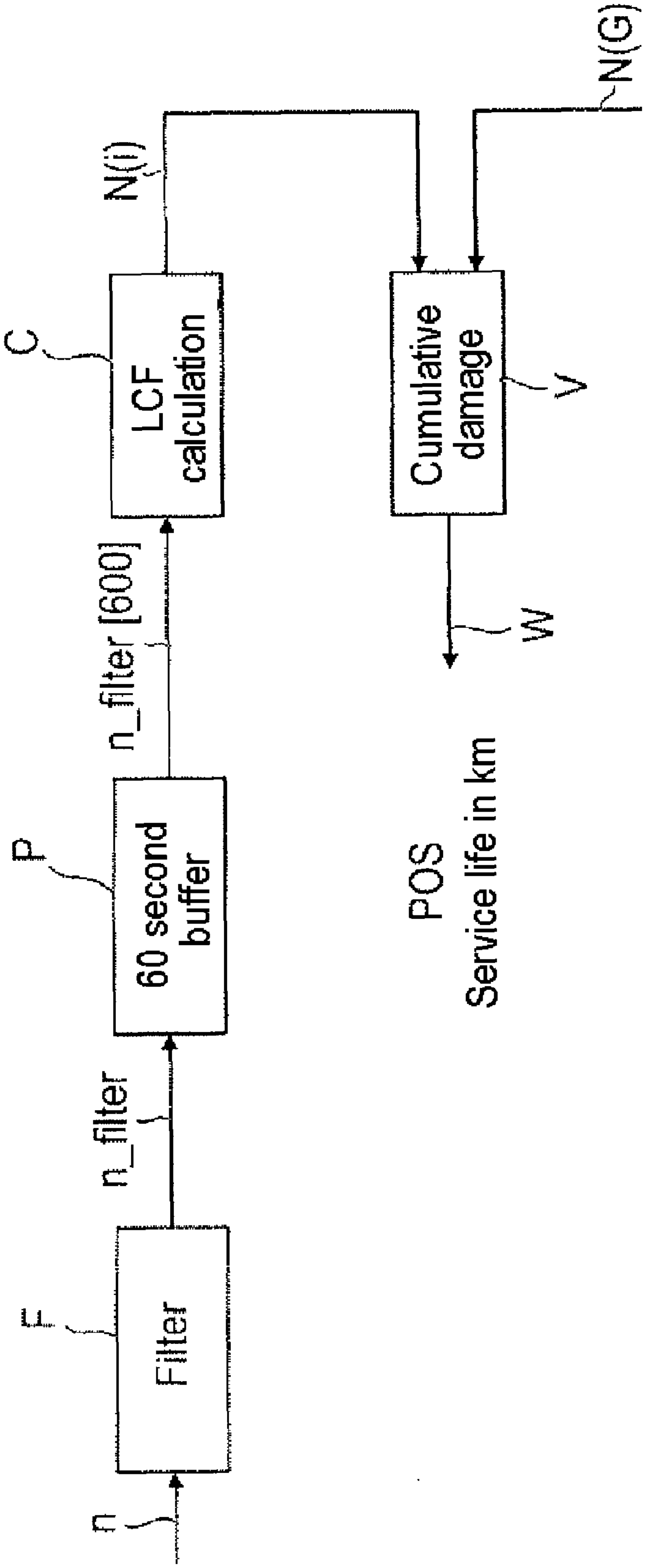
FIG. 2 is a block circuit diagram of a method for preventing the rupture of a compressor wheel and/or turbine wheel of an exhaust-gas turbocharger of a motor vehicle.

The invention will be explained in more detail below on the basis of a schematically highly simplified block circuit diagram, as presented in FIG. 2.

The block circuit diagram depicts one possibility for carrying out a method according to the invention, with the example being a so-called LCF method, with the abbreviation “LCF” standing for the expression “Low Cycle Fatigue”, which means fatigue on account of low loading.

In the illustrated example, a rotational speed n of the exhaust-gas turbocharger and/or of the internal combustion engine is determined and filtered in a filter F. The filtered rotational speed values $n_{Filter}$ are buffered in a buffer P, for example for 60 seconds, and are subsequently processed in a calculation block C in order to be able to determine a loading characteristic value n(i).

Said loading characteristic value n(i) is compared with a loading limit value n(G) in a comparator V in order to be able to output a warning W if appropriate in the event of an exceedance of a safety margin value.

LIST OF REFERENCE SYMBOLS

F Filter
P Buffer
C Calculation unit
V Comparator

W Warning n Rotational speed $n_{Filter}$ Filtered rotational speed n(i) Loading characteristic value n(G) Loading limit value

The invention claimed is:

1. A method for preventing a rupture of a compressor wheel and/or turbine wheel of an exhaust-gas turbocharger of a motor vehicle, having the following method steps:

establishing loading limit values (n(G)) for the compressor wheel and/or the turbine wheel in bench tests, the loading limit values (n(G)) representing the time at which a rupture of the compressor and/or turbine wheel would occur;

determining loading variables (n) for the compressor wheel and/or turbine wheel during the operation of the exhaust-gas turbocharger in the motor vehicle;

processing the determined loading variables (n) in order to establish a loading characteristic value (n(i)) which represents real exhaust-gas turbocharger operation;

comparing the loading limit value (n(G)) with the loading characteristic value (n(i)); and outputting a warning (W) if the comparison of the loading limit value (n(G)) with the loading characteristic value (n(i)) yields an exceedance of a predefinable safety margin, the predefinable safety margin being based on the established loading limit values (n(G)).

2. The method as claimed in claim 1, wherein the determined loading variables are processed by means of a mathematical algorithm.

3. The method as claimed in claim 1, wherein rotational speed of the exhaust-gas turbocharger, time periods of the occurrence of certain rotational speeds and rotational speed gradients are determined as loading variables.

4. The method as claimed in claim 3, wherein change in altitude covered by the vehicle and number of kilometers travelled are determined as additional loading variables.

5. A method for preventing a rupture of a compressor wheel and/or turbine wheel of an exhaust-gas turbocharger of a motor vehicle, having the following method steps:

establishing loading limit values (n(G)) for the compressor wheel and/or the turbine wheel in bench tests;

determining loading variables (n) for the compressor wheel and/or turbine wheel during the operation of the exhaust-gas turbocharger in the motor vehicle, the loading variables (n) including at least one of: change in altitude covered by the vehicle and number of kilometers travelled are determined as additional loading variables;

processing the determined loading variables (n) in order to establish a loading characteristic value (n(i)) which represents real exhaust-gas turbocharger operation;

comparing the loading limit value (n(G)) with the loading characteristic value (n(i)); and outputting a warning (W) if the comparison of the loading limit value (n(G)) with the loading characteristic value (n(i)) yields an exceedance of a predefinable safety margin.

* * * * *